(No Model.)
E. F CAMPBELL, L. C. NOBLE & M. G. HOWE.
NUT LOCK.
No. 300,211. Patented June 10, 1884.
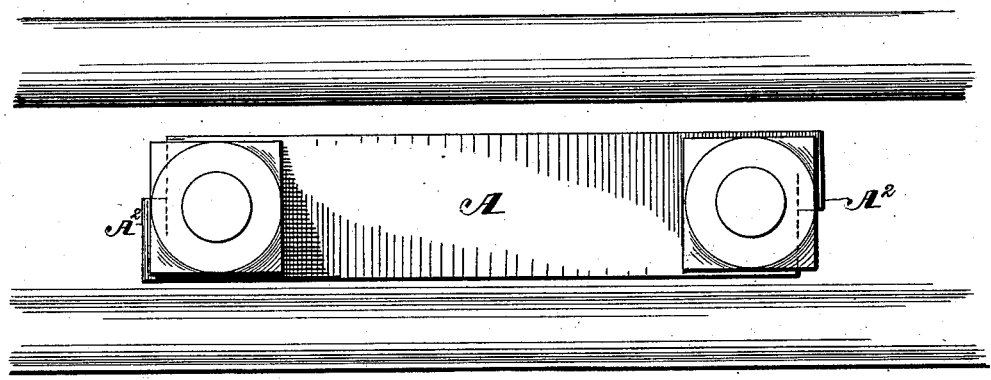
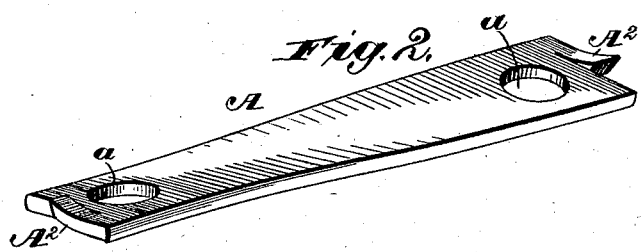
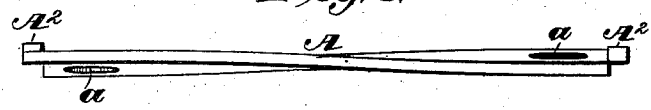
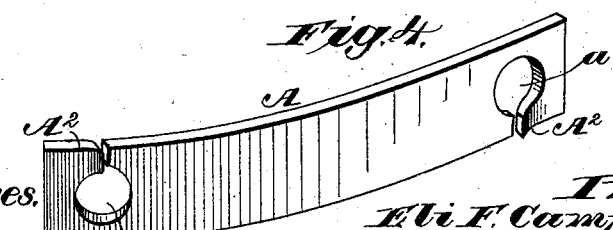
Witnesses.
Robert Emmitt
Chas. F. Hyer
Inventors
Eli F. Campbell
Laroy C. Noble
Milton G. Howe.
By James L. Norris, Atty.

UNITED STATES PATENT OFFICE.

ELI F. CAMPBELL, LAROY C. NOBLE, AND MILTON G. HOWE, OF HOUSTON, TEXAS.

NUT-LOCK.

SPECIFICATION forming part of Letters Patent No. 300,211, dated June 10, 1884.

Application filed March 17, 1884. (No model.)

*To all whom it may concern:*

Be it known that we, ELI F. CAMPBELL, LAROY C. NOBLE, and MILTON G. HOWE, citizens of the United States, residing at Houston, in the county of Harris and State of Texas, have invented new and useful Improvements in Nut-Locks, of which the following is a specification.

The present invention relates to that class of articles known as "spring-washers," and employed as nut-locks, as a fastening for rail-joints, and for other like objects.

The object of the invention is to provide a spring-washer of great stiffness and strength, which, when applied to a bolt beneath a nut, serves to prevent the latter from turning, and also acts to firmly hold the parts of a rail-joint after there has been some wear thereof, thus keeping the bolts from becoming loose and rattling from such wear.

The invention consists in a curved spring-plate or torsional spring-plate washer having openings for the passage of the bolts, and provided with lips or projections which project beneath the nut, and serve, by the great friction produced by the pressure of the spring, to hold the nuts firmly in place and prevent them from turning off. The lip on the spring-washer is so placed as to catch under the surface of the nut and hold it any point of a turn, instead of merely engaging with the side of the nut and only holding the latter at each quarter of a turn.

In the drawings, Figure 1 is a face view of a rail-joint, showing a torsional spring-plate washer fitted on the bolts beneath the nuts. Fig. 2 is a perspective view of such torsional spring-plate washer, showing the projecting lips or points. Fig. 3 is an edge view thereof. Fig. 4 is a perspective view of a curved spring-plate washer.

The letter A designates a spring plate or washer, which is made of stiff metal or steel, so that when applied to a bolt beneath a nut thereon it can be subjected to considerable strain or pressure without straining the spring up to the elastic limit of the steel. I have in the present instance shown the washer of an elongated form, and provided with two bolt-holes, $a$, for fitting it on the bolts of a rail-joint, as seen in Fig. 1. Washers for single bolts may be made, however, of plate metal in the aforesaid manner. The spring or elasticity is given to the washer-plate by twisting it slightly, so as to make it a torsional spring; or the plate may be curved, as is seen in Fig. 4. In either event, such a spring-plate applied to the bolts of a rail joint or fastening will exert a sufficient pressure upon the members of the joint or the rails themselves as to prevent the bolts from becoming loose or rattling by reason of the wear of the members of the joint. A lip or projection, $A^2$, is formed on the spring-washer at the side of the bolt-opening; and said lip is so disposed that it will catch under the surface of the nut and become to a certain extent embedded in the metal of the latter. The great friction produced by the pressure of the spring-washer, assisted by the projection or lip extending under the nut, will serve to keep the nut firmly in place and prevent it from turning off. The lip or projection is formed by slitting the ends of the washer and slightly bending up the slitted portion, the projection thus formed being pointed in the direction in which the nut moves when it is being screwed on the bolt. It is evident that the presence of a steel or hard-metal lip beneath a nut made of comparatively soft metal will cause said lip to be embedded to a sufficient extent in the metal of the nut by the act of screwing on the nut.

It has heretofore been proposed to provide nut-locking washers with lips which engage with the nuts; but in all cases familiar to us the lips engage with the sides of the nut, and only act upon the latter at each quarter of a turn thereof. In the construction proposed by us the spring-plate is sufficiently elastic to exert an outward pressure upon the nut and prevent its turning off from the bolt; but we make an absolutely safe and sure fastening by providing the lip which engages with the under side of the nut. In some forms of spring-washers the pressure thereof is so great that in turning the nut off, the lip on the washer will cut a shaving from the nut, which evidences the sure hold the washer has upon the nut.

What we claim is—

1. An elongated spring-washer plate having bolt-openings $a$ and lips or spurs $A^2$, projecting above the face of said plate in proximity to the bolt-openings, and adapted to engage with the under side of the nuts, substantially as described.

2. A torsional spring-washer consisting of a flat elongated metal plate slightly twisted in opposite directions from its center toward its ends, and provided with bolt-openings at the ends of said plate, substantially as described.

In testimony whereof we have hereunto set our hands in the presence of two subscribing witnesses.

ELI F. CAMPBELL.
    LAROY C. NOBLE.
    MILTON G. HOWE.

Witnesses:
 F. F. COLLINS,
 ALF. S. DYER.